Patented Oct. 31, 1944

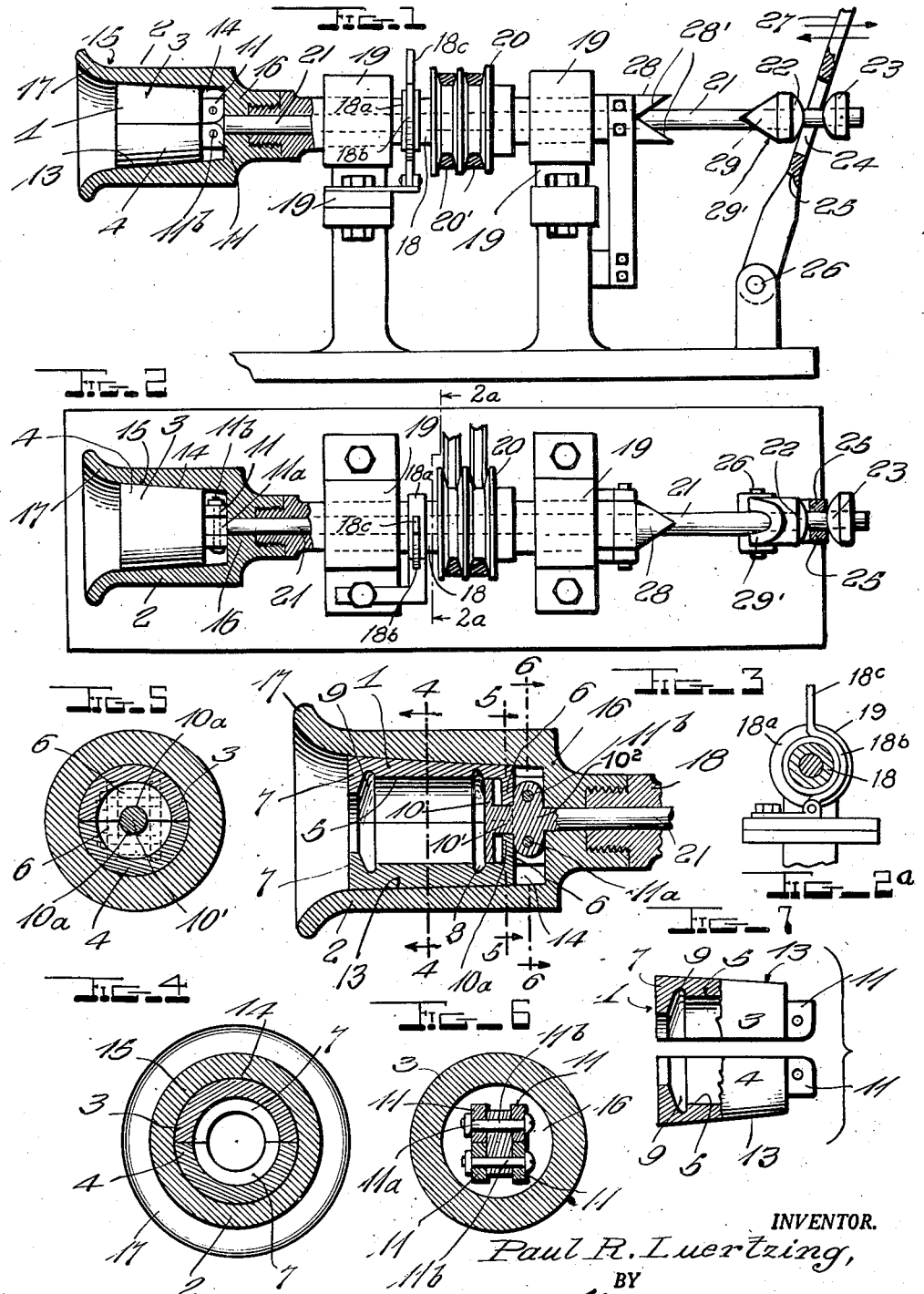

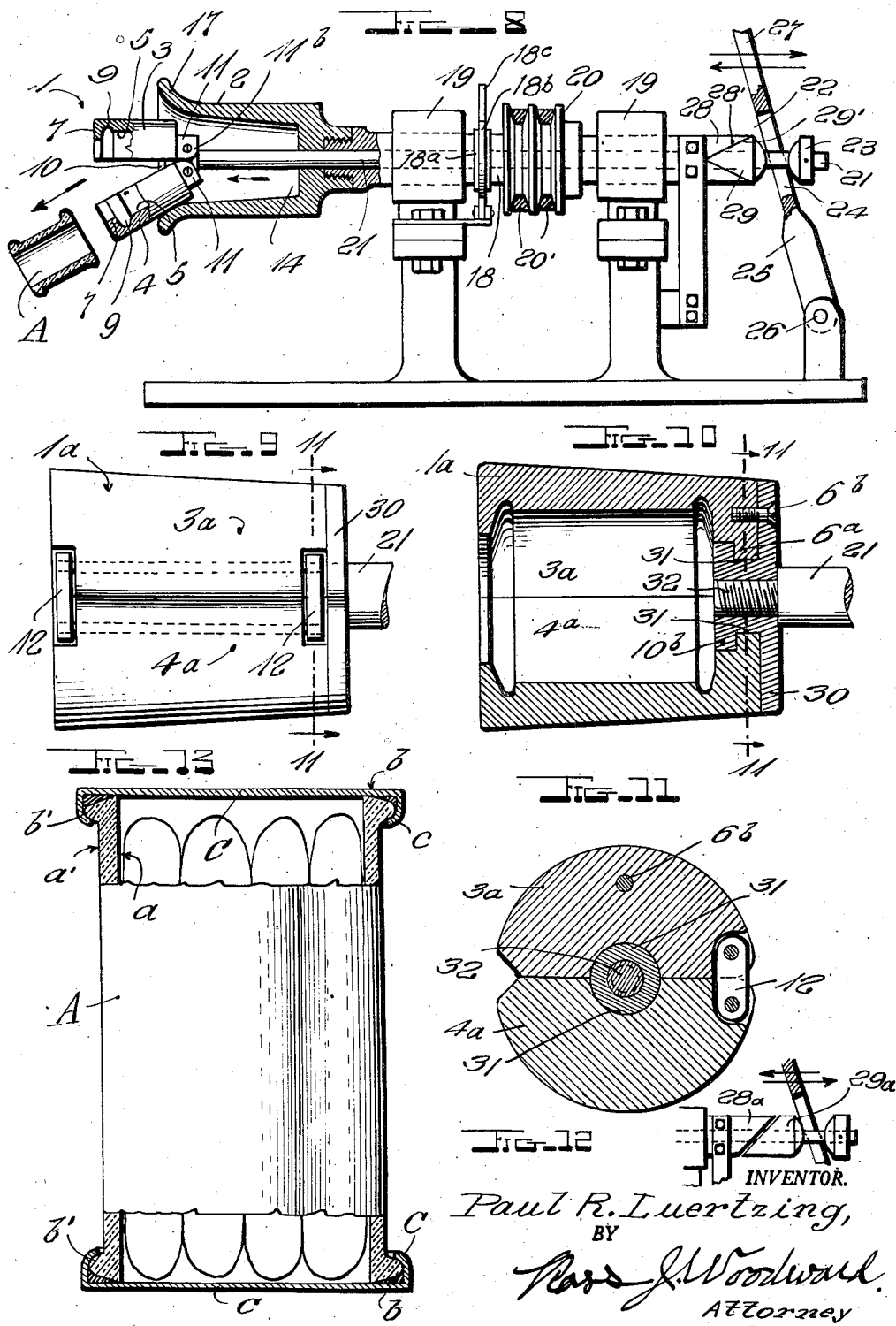

2,361,553

UNITED STATES PATENT OFFICE 2,361,553

APPARATUS FOR MANUFACTURING HOLLOW GLASS ARTICLES

Paul R. Luertzing, Vineland, N. J., assignor of one-half to Walter O. Luertzing, Vineland, N. J.

Application August 23, 1940, Serial No. 353,951

18 Claims. (Cl. 49—31)

This invention relates to an apparatus for manufacturing hollow glass articles, and particularly for manufacturing a tubular or cylindrical container body of a type which is open at both ends and of uniform internal diameter throughout its length and of a desired external configuration or provided with any desired form, number or arrangement of external projections giving ornamentation or utility or both to the article. More particularly the invention relates to an apparatus for manufacturing a container body of this type complete with suitably finished ends which are preferably adapted to have heads or closures applied thereto and firmly secured in sealing engagement therewith.

Attempts have previously been made to form such articles, but such attempts have not been commercially successful, as complicated and expensive machinery was necessary in their production, and/or it was necessary to first form a blank or partially formed or unfinished article and then subject the blank or unfinished article to other forming or finishing operations in order to complete the manufacture of the article.

One object of the present invention is to provide an apparatus whereby a tubular or cylindrical article of this character, with finished ends and ready for intended use may be easily and quickly molded in a single operation, and without the necessity of carrying out additional forming operations, thus reducing the cost of manufacture so that such container bodies or other similar hollow glass articles may be manufactured at a cost which is commercially practical.

Another object of the invention is to provide an apparatus whereby formation of a cylindrical glass body of the character described ready for use may be carried out in a practical and commercially successful way through the medium of centrifugal force created in a rotary mold acting as a single forming agent and without the use of other auxiliary forming means or agents to produce the completed article.

Still another object of the invention is to provide an apparatus whereby a hollow glass article, such as a cylindrical container body open at both ends, of a uniform internal diameter throughout its length, and having a smooth inner surface and an outer surface of any desired external form or configuration conforming to the internal shape of a mold in which it is made, may be manufactured in a highly rapid manner and released without injury or necessity of subsequent finishing from the mold.

Still another object of the invention is to provide an apparatus for manufacturing an article of this character in which the forming surface of the mold, speed of rotation of the mold and centrifugal force employed are or may be so correlated and cooperate as to secure a rapid flow of the hot glass against the forming surfaces of the mold to prevent undesired cooling of the glass and thereby to enable in a single operation a perfect article to be produced which is free from structural or appearance flaws due to early cooling and resulting skin effects or other causes.

Still another object of the invention is to provide an apparatus for making by centrifugal force a hollow glass article of the character described in an openable and closable mold having a forming surface allowing an article of any desired external configuration or with external projections to be formed, wherein the action of centrifugal force is also utilized as an agent in holding the mold closed, and whereby the steps of manufacture and discharge of the article from the mold are such as to prevent liability of injury to the article which might otherwise result through any degree of opening movement of the mold before the article is completely formed or cooled to a sufficient extent for safe removal.

Still another object of the invention is to provide an apparatus for manufacturing hollow glass articles of the type described in a rotary mold of such form and operated at such speed and under such a degree of centrifugal force as to ensure the production in a rapid manner of finished articles free from structural or surface flaws.

Still another object of the invention is to provide an apparatus whereby hollow glass articles of uniform wall thickness may be formed within a mold without the necessity of preliminarily shaping a glass charge, without the necessity of maintaining accurate control of the viscosity or temperature of the charge, as the viscosity and temperature of the glass may vary within fairly wide limits, and without the use of any other shaping means within or operating in conjunction with the mold to shape or direct the flow of glass in the forming operation, and whereby such articles after being formed may be released from the mold without injury or deformation.

The apparatus herein shown and claimed may be used in carrying into practice a method of making hollow glass articles which is disclosed and claimed in my copending application, Serial No. 353,952, filed of even date herewith.

In the accompanying drawings showing for purposes of exemplification certain means for carrying the invention into practical effect.

Fig. 1 is a side elevation of the apparatus with the mold and holder shown in section and the mold drawn into the holder for an article forming action.

Fig. 2 is a top plan view of the same.

Fig. 2a is a section on the line 2a—2a of Fig. 2.

Fig. 3 is a sectional view of the mold and holder on an enlarged scale.

Figs. 4, 5 and 6 are cross-sections on the lines 4—4, 5—5 and 6—6 of Fig. 3.

Fig. 7 is a view, partly in side elevation and partly in section, of the sections of the mold detached from the shifter rod.

Fig. 8 is a view similar to Fig. 1 of the apparatus showing the mold freed from the holder and opened to eject a formed article.

Fig. 9 is a view in side elevation of a modified form of mold.

Fig. 10 is a longitudinal section of the same.

Fig. 11 is a cross-section on line 11—11 of Figs 9 and 10.

Fig. 12 shows the cams used in the modified construction.

Fig. 13 is a view of one form of hollow glass article which may be made by the improved process, namely, a container body having sealing closures applied thereto.

In carrying my invention into practice I provide a closable and openable article forming rotary mold 1 which is adapted to be held in closed position while in operation within a mold holder or shell 2, which is rotatable in a forming operation in unison with the mold. These elements may be mounted for use in a vertical position or in a horizontal position or in any intermediate angular position. The mold and its holder are, however, preferably disposed for use in a horizontal position, as this position obviates the necessity of raising and lowering the mold for article forming and convenient article ejecting actions and provides for the more ready ejection of the formed articles and their transfer to a lehr for annealing.

The mold 1 comprises a generally cylindrical body divided along a central longitudinal line to form two sections 3 and 4. These sections are interiorly shaped to form an annular article body forming surface 5. Located beyond the ends of this surface 5, and respectively at the top and bottom or inner and outer ends of the mold, are inwardly extending flanges 6 and 7 which reduce the diameter of the mold chamber at these points. The inner surface of the flange 7, as shown, is continuous with the outer side of the groove 9 and said flange 7 extends inwardly beyond the forming surface 5 sufficiently to serve as a stop to limit and arrest the outward longitudinal flow of the glass and to deflect and direct the glass laterally into said groove. Additionally the inner surface of the flange 7 also forms a mold surface to give a desired form and finish to the outer end of the article being formed. Between these flanges and the respective ends of the surface 5 are grooves 8 and 9, the walls of the grooves and adjacent or inner faces of the flanges coacting to form article end finishing and shaping surfaces. A sealing disk or abutment plate 10 is arranged to peripherally bear on the inner faces of the flanges when the mold sections are closed and so as to form a seal to tightly close the bottom of the mold adjacent the inner side of the groove to prevent escape of glass at this point beyond the groove and to arrest the longitudinal flow of the glass at the inner end of the groove and deflect or direct the glass laterally into said groove. This plate also serves as a mold surface to give a desired form and finish to the inner end of the article being formed and has a rearwardly extending shank or stem 10' which is adapted to pass through and to be received in recesses 10a formed in the flanges 6, whereby the flanges are adapted to close snugly about said shank or stem. The flanges 6 are formed with perforated ears or hinge knuckles 11 and the shank or stem 10' is carried by a head 10² provided with similar knuckles 11a for the passage of pivot pins 11b whereby the mold sections are supported free from positive or direct connection with the disk 10 but are pivotally connected at their inner ends to the head 10² and to each other for radial swinging movements adapting the mold to be closed for use and opened for ejection of the formed article. The shank or stem 10' also serves to connect the mold to a shifter whereby it is adapted to be held in working position and to be shifted for opening and closing movements, as hereinafter described.

The mold 1 is fitted in the holder 2 for rotation therewith in an article forming operation and to slide longitudinally therein for closing and opening actions. To this end the outer surface 13 of the mold is longitudinally tapered and the holder 2 is provided with a chamber 14 to conformably receive the mold, the annular body wall of which has its inner surface 15 correspondingly tapered. The tapered surfaces 13 and 15 act not only as clutch surfaces to connect the mold and holder for rotation in unison, but also as variable binding surfaces to hold the mold from longitudinal movement and keep it closed in any of its seating positions in the holder and adapt the latter to act as a restrainer to prevent spreading of the mold sections under centrifugal force in the rotation of the mold and holder. The chamber 14 is closed at its inner end by a head 16 but normally open at its outer end to allow inward and outward movements of the mold, and said chamber and its tapered surface are of greater length than the mold to adapt the mold to be drawn inward to greater or less degrees in the holder and to be fully enclosed by the holder and held by the tapered surfaces in its seating position. At its outer end the holder is annularly enlarged or provided with a flaring or bell-mouthed portion 17 adapted to accurately guide the mold into the holder and to permit the mold sections to swing open as soon as the inner end of the mold is forced outwardly in an article removing action beyond the open end of the holder, but not before. By this means the mold is adapted to be seated fully and tightly at all times into the holder regardless of the different degrees of expansion to which the mold and holder are subjected by heat in the molding operations and the mold is also adapted to be held closed against any tendency of its sections to spread under centrifugal force.

The mechanism for rotating the mold and holder and sliding the mold into and out of the holder may be of any preferred construction. In the construction shown, however, the holder is mounted at its closed end on a hollow horizontal shaft 18 journaled in suitable bearing supports 19 and carrying a double pulley 20 driven by drive belts 20' from an electric or other suitable motor (not shown) capable of driving the mold and holder at a very high rate of speed. Suitable speed gearing may be used in the driven connection if and when required in order to obtain the desired high speed. Also any suitable type of brake mechanism or device, such as a brake disk 18a fixed to the shaft 18 and a brake shoe 18b pivoted to one of the supports 19 and provided with an operating lever 18c, may be used to quickly stop the rotation of the mold and holder at the end of each article forming action. Extending through the shaft 18 is a shifter rod 21 which projects at its forward end into the inner end of the mold holder, coaxially therewith and is integral with or suitably fixed to the head 10² whereby the rod is connected to the mold sections for shifting the same longitudinally in the holder. This rod is rotatable with the mold and holder in a molding operation and is adapted to be shifted longitudinally in one direction or the other when the mold and holder are at rest to draw the mold into the holder and close it or force it out of the holder and open it. The opposite end of the rod has fixed thereto a pair of spaced abutments 22 and 23 and the portion of the rod therebetween passes through an opening 24 in an operating lever 25 pivoted at one end on one side of the rod, as at 26, and having an operating end or arm 27 extending beyond the opposite side of the rod. This lever may be moved rearwardly to transmit movement through the abutment 23 to draw the open mold from ejecting position into the holder and may be moved forwardly to transmit movement through the abutment 22 to force the enclosed mold outwardly from the holder so that its sections will open for the ejection of the formed article. When the parts are in position for a molding operation the rod 21 will rotate freely in the opening but will be held fixed in such position during the molding period by the binding action of the mold against the holder, or it may be held fixed by manually holding or suitably fastening the lever 25 in its retracted position.

It is desirable to provide some means to ensure the accurate positioning of the mold for an opening and article discharge action when, at the end of an article forming operation, it is brought to a state of rest and so that one of its sections will be disposed to drop downward to open the mold for the discharge or removal of the formed article. To this end a stationary rod turning member or cam having an annular series of prongs or projections 28 provided with inclined or cam faces 28' is provided upon one of the bearing supports 19 for cooperation with a rod turning member or cam integral with the abutment 22 and having similar prongs or projections 29 provided with inclined or cam faces 29'. These cams or rod turning members are so arranged that when the lever 25 is moved to shift the rod forwardly for a mold opening action, the cam surfaces of the members will be brought into engagement at the moment of release of the mold from the holder, so that if the mold is not disposed with one of its sections in position to drop down the rod will be rotated to turn it to such position. The cams or rod turning members when so engaged will also provide a lock to hold the mold in its discharge position.

When the mold is closed for the forming operation within the holder 2 the meeting edges of the mold sections are forced tightly together to seal the mold against the passage of glass at such points and prevent the formation of fins at the similar sides of the formed article. The closing of the mold sections together also causes a tight engagement of the mold walls with the periphery of the head 10 in line with the inner side of the groove 8, so that the head 10 seals the bottom of the mold against any escape of glass between the mold and head 10 and prevents the formation of a fin or other excrescence upon the adjacent end of the formed article. As shown, the flanges 7 at the outer ends of the mold sections extend radially inward beyond the article body forming surfaces of the mold sections so as to reduce the diameter of the mouth of the closed mold and form a mouth of a diameter sufficient to allow of the free introduction of a charge of glass and inflow and outflow of air during the forming operation, but insufficient to allow of the discharge of glass by centrifugal force in the forming operation. Thus even if the charge should be somewhat excessive in amount no discharge of glass through the mouth will occur, the outward flow of the glass being limited and arrested by the flange 7 and the excess glass being uniformly distributed over the forming surface 5. By this means an article of somewhat greater wall thickness than intended and within permissible limits will be produced, but the formed outer end of such article will be free from fins which would otherwise be formed thereon if any portion of the glass were permitted to pass into or outward through the mold mouth. The above described construction also adapts the head 10 and flange 7, which are fixed with relation to each other against movement longitudinally of the mold, to serve as article end forming and finishing surfaces and as deflectors to direct the glass laterally into the grooves 8 and 9, which in coaction with the head 10 and flange 7 give the desired shape and finish to the ends of the article. As the mold is held during rotation tightly clamped within the comparatively heavy holder or binder 2, it may be rotated at very high speeds to produce any centrifugal force desired without causing either body vibration of the mold or vibration of its walls liable to cause irregular distribution of the glass and the production of a faulty article. A particular advantage of this construction of mold, also, is that it allows formation of the article in a horizontal position without difficulty in feeding it with charges or liability of escape of glass, and with a saving of time over that of a vertically arranged mold in effecting the discharge of the formed article, while obviating the necessity of using an injector for discharging the article itself from the mold.

In Figs. 9, 10, 11 and 12 I have shown a modified form of mold 1a in which the mold is also divided longitudinally into two sections 3a and 4a, but in this construction the mold sections instead of being pivotally connected at their inner ends to the shifter rod head are hingedly connected, as at 12, at one side to each other and are formed separate from the rod or head but the upper one is fixed thereto by a suitable number of screws 6b. As shown, the inner ends of the molds are formed with inturned flanges 6a adapted to fit in an annular space or groove between a sealing disk or plate 10b and a shifter head or back plate 30 and formed with recesses 31 to snugly receive a shank or stem 32, which rigidly connects the sealing disk and head or back plate, when the mold sections are closed. The disk 10b, plate or head 30 and shank 31 are formed with a threaded bore to receive the forward threaded end of the shifter rod 21 or are otherwise connected thereto to couple the mold sections for shifting movements to the shifter rod. As in the construction shown in Figs. 1 to 7 inclusive, the mold sections here are connected to the shifter head 30 but are free from direct or positive connection with the sealing disk 10b which peripherally engages the walls of the mold sections at the inner ends thereof adjacent to and about the outer margins of the grooves 8 to seal the mold against the escape of glass beyond said grooves, or between said walls and the periphery of the sealing disk. The cams or stops 28a and 29a in this construction are formed as shown in Fig. 12 so that when the mold is stopped at the end of a molding operation and brought into proper ejecting position by the cams 28a and 29a the mold section 4a will always underlie the mold section 3a so that it may drop down to ejecting position on the hinge connections 12. The upper mold section will in this ejecting position be held in engagement with the rod 21 by its engagement with the head 10b and back plate 30. This mold is otherwise of the same construction as the mold 1 and operates in like manner.

In the operation of the apparatus for the carrying out of the method of manufacture, the mold, if not disposed within its holder, is drawn into the holder by a proper retracting movement of the shifter rod 21, whereby it is clutched to the holder for rotation therewith and held in closed position. The holder and the mold are then rotated at very high speed and a charge of glass of a proper amount and temperature is then suitably fed into the mold. While it has been stated that the mold and the holder are rotating when glass is fed into the mold, it will be understood that the glass may be fed into the mold before the mold and the holder are set in motion. The mold and holder are driven at such high speed as to produce a centrifugal force of such a degree as to cause the glass to spread and flow longitudinally and circumferentially over the forming surfaces on which it will be properly deposited to form an article of the character described, that is, a tubular or cylindrical body, open at each end and of uniform diameter from end to end thereof, which body is provided with finished end surfaces shaped, if desired, to produce upon its end surfaces external beads or other projections. The walls of this body, except where provided with external projections, will be of uniform thickness. The rotation of the mold at the desired high speed effects the distribution of the glass and formation of the article in a finished shape and ready for its intended use within a few seconds or very small period of time. At the end of this forming period the rotary motion of the mold and its holder is arrested and the mold and holder brought to a stop, whereupon the lever 25 is operated to shift the rod 21 forwardly to displace the mold from the holder. During this shifting movement, and at all times until the rear end of the mold comes into engagement with the flaring outer end of the holder, the mold is held securely closed and against any liability of accidental opening causing injury to or deformation of the formed article. At about the time the mold clears its holder, the cam surfaces 29' of cam member 29 come into engagement with the cam surfaces 28' of cam member 28 and rotate the rod 21 to bring the mold into proper position, if not in such position, for the disposal of its sections so that one of the sections will drop down by gravity and allow ejection or removal of the article. After the mold has been in operation for some time and the mold and its holder becomes highly heated and expanded to different degrees at different high temperatures, the mold seats to a greater or less depth in its receiving chamber in the holder, which compensating action is allowed by the slight taper of the tapered clutch surfaces of the mold and holder, so that a tight engagement between the mold and holder to fully close the mold and keep it closed for a forming action will be obtained, but the length of the holder chamber insures at all times the drawing of the mold into the chamber to a sufficient degree to close it and to keep it closed against opening or outward longitudinal movement under the action of the centrifugal force. By this means a simple and effective construction is provided to compensate for temperature changes and expansion and contraction of the holder and to secure a positive closing of the enclosed mold and maintenance of the mold in closed position until it is fully displaced from the holder for an article ejecting action.

It will be understood that in the forming operation above described the glass flowing longitudinally of and around the mold surface will be checked in its longitudinal flow as it strikes the inner surfaces of the flange 7 and sealing head 10 and will thereby be prevented from escaping outward into or escaping through the mold mouth or passing inwardly beyond the groove 8 and between the periphery of the head 10 and portions of the mold with which it contacts. By this means the loss of glass through the mold mouth or formation of fins or other excrescences upon the ends of the article will be avoided. The glass striking the inner surfaces of the flange 7 and head 10 will thus be confined in the mold between the flange 7 and head 10 which will deflect the glass into the grooves 8 and 9 and form the ends of the article with external projections having completely finished surfaces.

The apparatus may be employed for manufacturing tubular or cylindrical articles of uniform internal diameter and smooth internal finish from end to end thereof and provided with plain finished ends or with finished ends of a type having external beads, threads or other projections for use in connection with closure members adapted for tight sealing engagement with the beads, threads or other projections to close the ends of the container. In practice, the article body forming surface of the mold may be shaped to produce an article which is externally of true cylindrical shape or of any other desired external shape and which is formed or not with letters, figures, monograms, trademarks or other ornamental matter molded integrally therewith. Where an article of truly cylindrical shape, both internally and externally is produced, the article will be of equal wall thickness throughout and provided with smooth, finished internal and external surfaces.

In Fig. 13 I have shown a type of article which the apparatus as specifically disclosed herein is designed to produce. This comprises a tubular or cylindrical container body A, having an internal surface a of unform diameter from end to end, a cylindrical outer surface a', both of which surfaces are smooth surfaced, and finished end portions b provided with external annular beads b' for the engagement therewith of the hooked or flanged edges c of sealing closures or caps C, whose flanges are adapted to be crimped over and interlocked with the beads to firmly secure the sealing closures in position. Container bodies of this type may be used for the putting up of fruits, vegetables, jellies, preserves and other commodities which may be conveniently packed in this manner for sale and so as to produce an attractive form of package through which the packed commodity will show so as to give an attractive display. Similarly, the container body may be formed, in place of beads, with threads or cam or other projections for the engagement therewith of seals or closures suitably constructed to engage the threads or projections.

While, as stated, the mold may be operated in a vertical positon, a horizontal position, or any intermediate position, I preferably operate the mold in a horizontal position or in a substantially horizontal positon, that is, at a slight upward angle to the horizontal, as in this position the mold may be operated with greater facility and with the advantage of producing uniformly better articles and with less liabilty of producing faulty articles, or of formed articles cracking in the mold, than if the mold were operated in a vertical positon or at an angle approaching the vertical. A long and extensive course of experimentation has shown that this is true in spinning all cylindrical glass articles as speed in forming the article from the molten glass and in discharging the article from the mold is essential in order to produce an unblemished article and to prevent cracking of the article in the mold before it can be discharged. This is due to the fact that any retardation of the flow of glass while the glass mass as a whole is in contact with a portion of the mold wall causes, by chilling and setting of the glass, a skin formation which, besides interfering with the free and unrestricted flow of the glass and the production of an article of proper wall thickness, shows as a flaw or blemish in the finished article, and also to the fact that the difference in expansion and contraction between the metallic mold and the glass is so great that it is liable to result in the cracking of the formed article if not removed at once from the mold. After the article has been formed it quickly chills and sets and, at the same time, the mold cools and begins to contract inward considerably more than the glass and consequently results in cracking the finished article unless quickly removed. It is, therefore, important to distribute the glass from the time of deposit rapidly over the forming surface for the production of the article and to discharge the article as quickly as possible from the mold. If the mold is used in a vertical position, the glass charge supplied, whether the mold is at rest or spinning, will fall in a mass to the bottom of the mold. Even if the mold is then operated at high spinning speed, the inertia of the mass of glass and the force of gravity must be overcome before the glass begins to climb and to be spread. Contact of the glass with the bottom of the mold under these conditions causes chilling and setting of the glass to a degree which increases the resistance to the free flow of the glass and is also liable to cause the formation of a solid skin at the contact point which shows as a blemish in the formed article. The resistance to the flow of glass, furthermore, tends to prevent equal distribution and to form an article which is not of equal wall thickness. Some time is also required for the extraction of the article from the vertically disposed mold as the mold must be opened and the article physically extracted, with liability of damage thereto, or the mold must be turned down to a horizontal position for discharge of the article, requiring a period of time in either case during which the article is liable to crack owing to the more rapid cooling of the mold. These objections are avoided by the operation of the mold in a horizontal position or substantially horizontal position, which allows an elongated charge of glass equal in volume to the article to be fed through the open end or mouth of the mold into the mold and deposited on the article forming surface 5 of the mold at some intermediate point in its length while the mold is stationary or substantially so, i. e., slowly rotating, so that by rapidly accelerating the rotation of the mold to a high speed to effect the spinning operation, the glass will be spread uniformly in all directions in the length of the mold, which reduces the time period of distribution to such an extent as to avoid skin formation and restriction to the flow of glass. With the mold in a horizontal position, or substantially horizontal position, the time period for the discharge of the article is also reduced so that it may be removed before liability of cracking, due to rapid temperature changes between the mold and article occurring, as when the article is completed it may be discharged by simply moving the mold out of the holder to discharging position, in which it operates to automatically discharge the article, which is facilitated by my construction and arrangement of mold.

It is the general custom to make glass article forming molds of cast metal or other metals which, as a result of their composition, have minute pits, sand holes or other crevices, flaws or imperfections in their forming surfaces, and which are generally not found objectionable or faulty for use in ordinary glass molding operations because of the low glass forming pressures employed. I, however, form my improved mold, and also preferably its holder, of a hard, high heat and high temperature resisting metal, such as stainless steel, that is, a metal which may be machine finished to make the tapered engaging surfaces smooth and true fitting and particularly for the purpose of enabling the forming surfaces of the mold to be machine finished to a highly polished condition. By this means a mold surface is produced which is free from pits or other surface imperfections into which the glass may be forced under the high centrifugal pressure set up in the operation of the mold, thereby interfering with the free flow of the glass and causing imperfections in the external surface of the formed article giving it an undesirable rough, unfinished or frosted appearance. Furthermore, by providing the mold with a smooth highly polished surface, a material and important advantage is gained in a centrifugal molding action, in that, in addition to the smooth surface imparted to the glass, the glass may flow with less resistance and greater speed over the forming surfaces, the speed of flow being the result of the amount of centrifugal force used plus the reduction of resistance due to the use of the polished surface. The resultant increased speed of action ensures the entire deposit of glass and formation of articles within such a small time period that chilling of the glass by contact with the mold prior to or at the beginning of its flow to such an extent to cause imperfections due to skin effects will be avoided, and an article free from imperfections and uniformly clear and of high transparency produced. By using glass charges of a suitably high temperature, an additional advantage may be gained by this rate of flow in that the high initial heat of the glass, largely retained instead of being dissipated to a material degree, tends to give the article a highly smooth and polished effect similar to that produced by fire polishing. It is to be understood, however, that I may use a hard metal mold having a polished forming surface purposely formed with pits or indentations when it is desired to manufacture glass bodies having frosted surfaces.

As a result of the method of manufacture herein described I am able to produce, within a minimum period of time for each forming action, hollow glass articles of the character set forth for the purposes described and other purposes which are transparent, free from structural flaws and surface imperfections, transparent to a high degree and of a highly smooth and polished appearance. Each article may be made in a single operation complete in itself as intended for use, and without the necessity of carrying out any completing or finishing operations whatever. Such articles may be made without the necessity of pre-forming a glass charge, pressing, blowing or subjecting it to a vacuum operation in the mold or otherwise holding it in the mold or shaping it except by the single action of centrifugal force, and without special regard to the temperature and viscosity of the glass charge, within reasonable limits. By the use of a type of mold and holder of the character disclosed, the forming operation at very high speed and under high centrifugal force may be carried out without liability of the opening of the mold to any degree during the formation of the article, so that perfect articles will be produced. By the use of a hard metal mold having a highly polished forming surface and operated at a sufficiently high speed to produce a centrifugal force acting to cause the flow of glass with minimum resistance along and its deposit upon the forming surface, the glass is flowed and deposited in such a short period of time, before cooling causes skin effects to take place, that defects due to undue cooling of the glass before formation of the article are entirely eliminated.

It will, of course, be understood that while the construction of the apparatus herein disclosed is preferred, changes in the form, construction and arrangement of the parts, falling within the scope of the appended claims, may be made without departing from the spirit or sacrificing any of the advantages of the invention.

What I claim is:

1. In an apparatus for centrifugally forming a hollow glass body open at both ends, a rotary mold formed of sections relatively movable to open and closed positions, a holder to fit about the mold and hold the mold sections closed, means for rotating the holder and mold at high speed to create centrifugal force and distribute glass in the mold to form the glass body, means for shifting the mold into and out of the holder, and means operating when the mold is shifted out of the holder to turn the mold and bring it to a prescribed position to permit opening movement of the mold sections and discharge of the formed glass body from the mold.

2. In a centrifugal apparatus for forming a hollow glass body open at both ends, a longitudinally divided rotary mold formed of sections at least one of which is pivotally mounted for movement into and out of mold closing and opening positions, a holder for receiving the mold and holding the sections closed, means for rotating the holder and mold at high speed to create centrifugal force and distribute molten glass upon the walls of the mold to form a cylindrical body open at both ends and of an even diameter throughout its length, means for engaging the mold with or releasing it from the holder, means for stopping the rotation of the mold and holder, and means operative upon stoppage of the mold and holder and release of the mold from the holder for turning the mold to a position for downwardly swinging movement of a pivoted mold section by gravity to an opened position for discharge of the formed glass body from the mold.

3. In a centrifugal apparatus for forming a hollow glass body open at both ends, a longitudinally divided rotary mold formed of a pair of pivoted sections movable into and out of a closed position, a rotary binder for fitting snugly about the mold and holding the sections thereof tightly closed, means for rotating the mold and the binder at high speed on a horizontal axis to create centrifugal force and distribute molten glass against walls of the mold and form a cylindrical glass body open at both ends and having a smooth inner surface of an even internal diameter throughout its length, means for shifting the mold longitudinally into and out of the binder, means for stopping the rotation of the binder and mold, and means operative on stoppage of rotation of the mold and binder and release of the mold from the binder to rotate the mold and bring one or the other of its sections into position to drop by gravity to open position for discharge of the formed glass body from the mold.

4. In an apparatus for forming a hollow glass body open at both ends, a rotary mold formed of pivotally mounted sections and having an article body forming surface, said mold being open at one end and provided with an inwardly extending flange at its open end and a sealing head against which the sections of the mold abut to close the mold at its other end, the ends of the mold being formed to provide outstanding beads at the ends of the glass body formed in the mold, a rotary binder for fitting about the mold, said mold having sections one of which at least is pivoted for swinging movement relative to another into and out of a closed position, means to shift the mold into and out of the binder, the mold and the binder being tapered to establish a wedging fit and cause the mold sections to be held tightly closed and eliminate crevices between the sections when the mold is shifted into the binder, means to rotate the mold and the binder at high speed for centrifugally distributing the glass upon the mold surfaces, and means to turn the mold to a predetermined position as it is shifted out of the binder to dispose one pivoted mold section lowermost for downward swinging movement to an opened position for discharge of a formed glass body from the mold.

5. In an apparatus for forming a hollow glass body open at both ends, a rotary shaft, a head at one end of the shaft, a mold connected to the shaft and open at one end and consisting of longitudinally extending sections in side by side relation to each other and one of which at least is pivotally mounted for movement relatively to another into and out of a closed position, a tubular shaft about the first shaft, a solid shell carried by the tubular shaft and constituting a cylindrical binder for fitting snugly about the mold and clamping the mold sections tightly against each other in a closed position, means for rotating the shafts at high speed to create centrifugal force for distributing molten glass in the mold against walls thereof to form a cylindrical glass body open at both ends, means for shifting the first shaft longitudinally to effect movement of the mold into and out of the shell, and means acting on the first-named shaft to rotate the mold as the mold is shifted out of the shell and dispose a pivoted mold section in position to swing downwardly to an opened position and allow discharge of a formed glass body from the mold.

6. In an apparatus for forming a hollow glass body open at both ends, a mold comprising longitudinally extending sections in side by side relation to each other and pivoted for movement into and out of a closed position and having an internal annular article body forming surface terminating at its ends in grooves or recesses for forming outstanding beads about the ends of the article body, a binder for fitting snugly about the mold and holding the sections thereof tightly closed, means for shifting the mold into and out of the binder, means for rotating the mold and the binder at high speed for creating centrifugal force to distribute molten glass against side walls of the mold and form a cylindrical glass body open at both ends and having outstanding beads at its ends and a smooth inner surface of an even diameter throughout its length, means to stop rotation of the mold, and means for turning the mold as it is shifted out of the binder to dispose one of the mold sections in position to move downwardly by gravity to an opened position allowing discharge of the formed glass body from the mold.

7. In an apparatus for centrifugally forming a hollow glass body open at both ends, a mold having sections mounted for movement into and out of a closed position, a binder shell to receive and hold the sections tightly closed during a molding operation, said mold having an annular article body forming surface and surfaces for forming the body with finished ends and with outstanding beads adjacent the finished ends, means coupled to the binder shell for rotating said shell and therewith the mold at high speed to create centrifugal force for distributing molten glass upon said surfaces, means for shifting the mold longitudinally into and out of the binder shell, and means for turning the mold on being shifted out of the shell to dispose a mold section for downward movement to open position.

8. In an apparatus for casting hollow glass bodies open and finished at each end, an openable and closable rotating mold comprising pivotally mounted sections having article body forming and finishing surfaces, a holder for receiving and fitting snugly about the mold and holding it closed, means for relatively moving the mold holder and mold for mold opening and closing actions, means coupled to the holder for rotating the holder and therewith the mold at high speed sufficient to create centrifugal force to evenly distribute molten glass against said surfaces of the mold, and means operable upon movement of the mold out of the holder to turn the mold about its axis and dispose one of its sections in position for downward movement to open position.

9. In an apparatus for centrifugally forming a hollow glass body, a rotary mold formed of sections relatively movable to open and closed positions, a holder to fit about the mold and hold the mold sections closed, means for rotating the holder and mold at high speed to create centrifugal force and distribute glass in the mold to form the glass body, a rotatable element connected to the mold and longitudinally movable for shifting the mold into and out of the binder, and means operating when the mold is shifted out of the binder for rotating said element and the mold to bring the mold to a prescribed position to permit a mold section to drop open for the discharge of the formed glass body from the mold.

10. In an apparatus for centrifugally forming a hollow glass body, a rotary mold formed of pivotally mounted sections relatively movable to open and closed positions, a holder to fit about the mold and hold the mold sections closed, means for rotating the holder and mold on a horizontal axis at high speed to create centrifugal force and thereby distribute glass in the mold to form the glass body, means for shifting the mold into and out of the holder, and means operating when the mold is shifted out of the holder to rotate the mold about its axis and bring it to a prescribed position for pivotal opening movement of one of the mold sections so as to allow discharge of the formed glass body from the mold.

11. In an apparatus for centrifugally forming a hollow glass body, a rotary mold formed of sections relatively movable to open and closed positions, a holder to fit about the mold and hold the mold sections closed, means for rotating the holder and mold at high speed to create centrifugal force and thereby distribute glass in the mold to form the glass body, means for shifting the mold into and out of the holder, and means operating when the mold is shifted out of the holder to positively rotate the mold about its axis to bring it to a prescribed position for an opening movement of the mold and the discharge of the formed glass body from the mold.

12. In an apparatus for centrifugally forming a hollow glass body, a rotary mold formed of a pair of longitudinally divided pivotally mounted sections movable to open and closed positions, a holder to fit about the mold and hold the mold sections closed, means for rotating the holder and mold at high speed to create centrifugal force and thereby distribute glass in the mold to form the glass body, means for shifting the mold into and out of the holder, and means operating when the mold is shifted out of the holder to rotate the mold about its axis so as to bring the pivot of one mold section or the other into a prescribed position to permit opening movement of said mold section so as to allow discharge of the formed glass body from the mold.

13. In an apparatus for centrifugally forming a hollow glass body, a rotary mold having a tapered outer surface and formed of longitudinally divided sections relatively movable to open and closed positions, a holder having a tapered chamber to bindingly receive the mold, whereby the holder and mold are adapted to be frictionally coupled for conjoint rotation and the mold held closed, said chamber being provided with an outwardly flaring mouth to effect a closing movement of the mold as it enters the chamber and to allow of a gradual opening movement of the mold as it leaves the chamber, means for rotating the coupled holder and mold at high speed to create centrifugal force and thereby distribute glass in the mold to form the glass body, means for shifting the mold into and out of the holder chamber, and means operating when the mold is shifted out of the chamber to turn the mold to a prescribed position and permit opening movement of a mold section and discharge of the formed glass body from the mold.

14. An apparatus for making an open ended tubular glass article with finished end surfaces in a single operation, comprising a rotatable substantially horizontally disposed mold having a forming chamber provided with a restricted feed mouth at one end thereof and having annular internal article body and end forming and finishing surfaces, said mold adapted to be maintained substantially stationary for the feeding thereinto through said mouth of an elongated molten glass charge of a volume equal to that of the completed article and the deposit of said charge on the internal annular article body forming surface at a point in its length, and means for controlling and operating the mold to hold it stationary or rotate it slowly during the feed of the charge thereto and deposit of said charge on the internal article body forming surface and then rapidly accelerating its rotation about a substantially horizontal axis to a high rate of speed and cause by centrifugal force alone the universal flow of glass along its internal forming surfaces to complete the article.

15. An apparatus for making an open end tubular glass article with finished end surfaces in a single operation, comprising a substantially horizontally disposed rotatable openable and closable mold having a forming chamber provided with a feed mouth and with annular internal article body and article end forming and finishing surfaces, said mouth being formed to admit the feeding of an elongated charge of molten glass into the chamber of the substantially horizontally disposed mold and its deposit on the annular article body forming surface thereof at some point in its length, means for holding the mold closed, means for moving the mold to closed and open positions, and means for controlling and operating the mold to hold it stationary or rotate it slowly during the feeding of the charge and its deposit on said article body forming surface and then rapidly accelerating rotation of the mold about a substantially horizontal axis to a high rate of speed to cause by centrifugal force alone the universal flow of glass along its internal forming surfaces to complete the article.

16. An apparatus for making an open ended tubular article with finished end surfaces in a single operation, comprising a substantially horizontally disposed externally tapered rotary mold formed of sections relatively movable to open and closed positions and having an internal annular forming surface and a relatively restricted feed mouth, a holder to enclose the mold and hold the mold sections tightly closed, said holder having a tapered chamber corresponding substantially in length to and adapted to fully receive the enclosed mold and having an open end portion forming a bell-shaped mouth tapering outwardly at a greater degree than the chamber and lying outwardly beyond the mold when the latter is enclosed in the chamber, means for controlling and operating the mold and holder for holding them stationary or rotating them slowly to allow an elongated charge of molten glass to be fed through the mold mouth and deposited on the internal forming surface of the mold at some point in the length thereof and for then rapidly accelerating the rotation of the mold and holder to cause by centrifugal force alone the universal flow of glass along the internal forming surface to complete the article, and means for shifting the mold into and out of the tapered chamber of the holder and operating when the mold is shifted out of said chamber to bring it to a position to permit the mold sections to tilt to open position at an outward and downward angle on the bell mouth of the holder for the discharge of the formed article from the mold.

17. An apparatus for making an open ended tubular article with finished end surfaces in a single operation, comprising a horizontal rotary and slidable shaft, a mold connected solely to said shaft and having an internal annular forming surface and a relatively restricted mouth at one end thereof to allow feeding of an elongated charge of glass to the mold and its deposit on said surface, said mold consisting of longitudinally extending sections arranged in side to side relation to each other and one of which at least is pivotally mounted for movement relative to another into and out of closed position, a horizontal tubular shaft about the first shaft, a holder carried by the tubular shaft and adapted to snugly receive the mold and clamp the mold sections in closed position, the outer surface of the mold and inner surface of the holder being tapered for wedging engagement therebetween and said holder having a bell-shaped mouth arranged to project outwardly beyond the mold when the latter is enclosed in the holder, means for controlling and rotating the shafts to hold the holder and mold stationary or rotate the same at slow speed while the charge is being fed to the mold and thereupon rapidly accelerating the rotation of the holder and mold to a high speed to cause by centrifugal force alone the universal flow of glass along the internal forming surface to complete the article, and means acting on the first named shaft for shifting the mold into and out of the holder and to bring a mold section when the mold is shifted out of the holder into position to tilt at an outward and downward angle on the bell mouth of the holder for the discharge of the formed article from the mold.

18. An apparatus for making an open ended tubular glass article with finished end surfaces in a single operation, comprising a substantially horizontally disposed rotatable openable and closable mold formed of metal of a high degree of hardness and defining a forming chamber provided with a feed mouth at one end and with highly smooth and highly polished annular internal article body and article end forming and finishing surfaces, said mouth being of restricted diameter relative to the chamber and adapted to allow of the feeding of an elongated charge of molten glass into the mold chamber and its deposit on the annular article body forming surface thereof at some point in its length, means for holding the mold closed, means for moving the mold to closed and open positions, and means for controlling and operating the mold to hold it stationary or rotate it slowly during the feeding of the charge and its deposit on the article body forming surface and then rapidly accelerating its rotation about a substantially horizontal axis to a high rate of speed to cause by centrifugal force alone the universal flow of glass along its internal forming surfaces at accelerated speed due to the smoothness and polish of the surface.

PAUL R. LUERTZING.